| United States Patent [19] | [11] Patent Number: 4,478,587 |
|---|---|
| Mackal | [45] Date of Patent: Oct. 23, 1984 |

[54] INFLATABLE BOAT VALVE AND MOUNTING THEREFOR

[76] Inventor: Glenn H. Mackal, 4923 59 Ave. S., St. Petersburg, Fla. 33702

[21] Appl. No.: 442,115

[22] Filed: Nov. 16, 1982

[51] Int. Cl.³ ................................................ B63C 9/04
[52] U.S. Cl. ......................................... 441/41; 137/224
[58] Field of Search ...................... 441/40, 41, 90–101; 137/223, 224, 232, 233, 234, 522

[56] References Cited

U.S. PATENT DOCUMENTS

| 1,534,862 | 4/1925 | Myers | 137/233 |
| 2,219,190 | 10/1940 | McCoy | 137/223 |
| 2,971,526 | 2/1961 | Boyer et al. | 137/223 |
| 4,015,622 | 4/1977 | Pagani | 137/223 |

FOREIGN PATENT DOCUMENTS

| 811045 | 3/1959 | United Kingdom | 441/40 |
| 1179468 | 1/1970 | United Kingdom | 441/41 |

Primary Examiner—Sherman D. Basinger
Assistant Examiner—Jesûs D. Sotelo

[57] ABSTRACT

A valve for use with an inflatable article having side walls made of flexible impervious fabric, the valve being attached and sealed to the article at an opening through the side wall thereof. The valve has a hollow valve body having a fixed seat therein, a valve element within the valve body and selectively movable into and out of sealing engagement with the valve seat, and a resilient spring constantly urging the valve element toward and into sealing engagement with the valve seat. The valve is attached and sealed by a nut screwed onto the valve body, the nut having a first, axially outwardly expanding frusto-conical flange on its axially outer end, the first flange underlying the portion of the fabric which surrounds the opening through the side wall of the article, and a second frusto-conical flange attached to the valve body. The second flange is coaxial with and substantially parallel to the first flange; the second flange overlies at least a part of the portion of the fabric which surrounds the opening through the side wall of the article and which overlies the first flange, the two flanges forcibly and sealingly engaging opposite sides of the portion of the fabric which is disposed between them.

13 Claims, 25 Drawing Figures

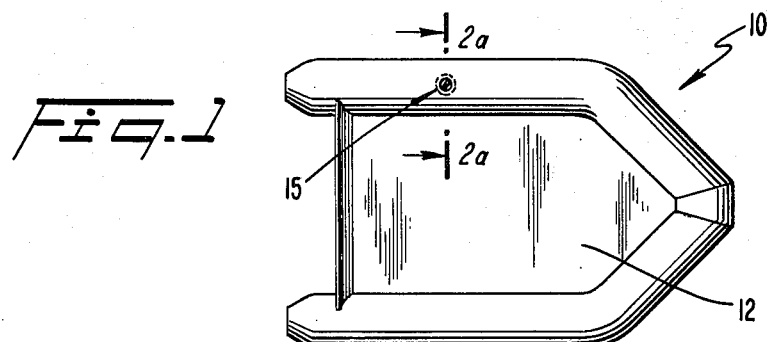
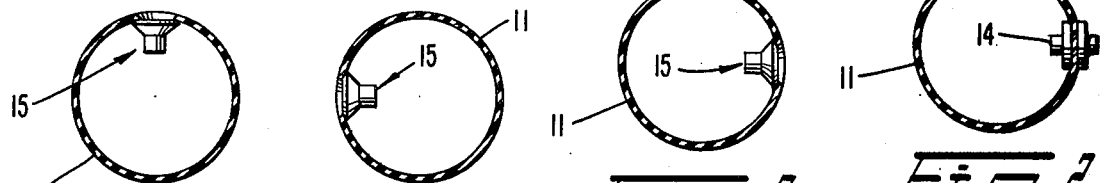
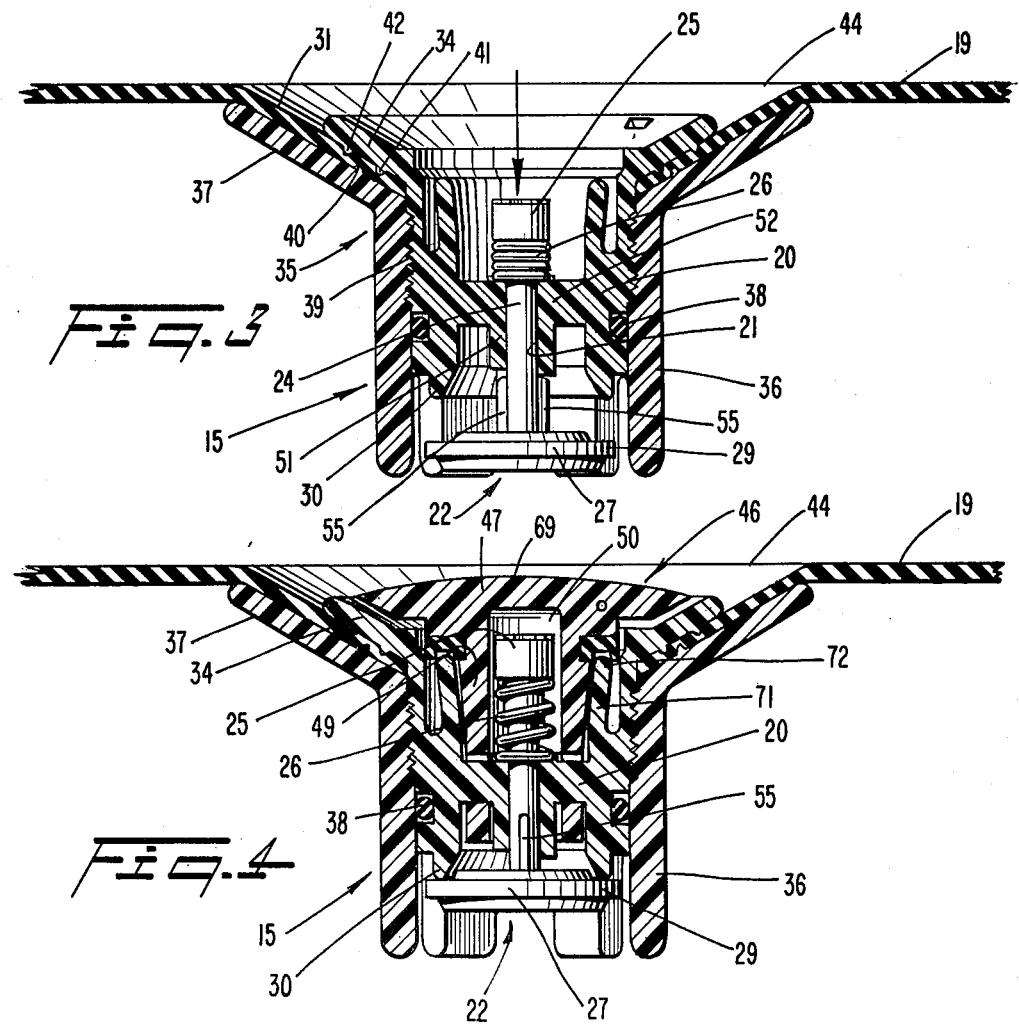

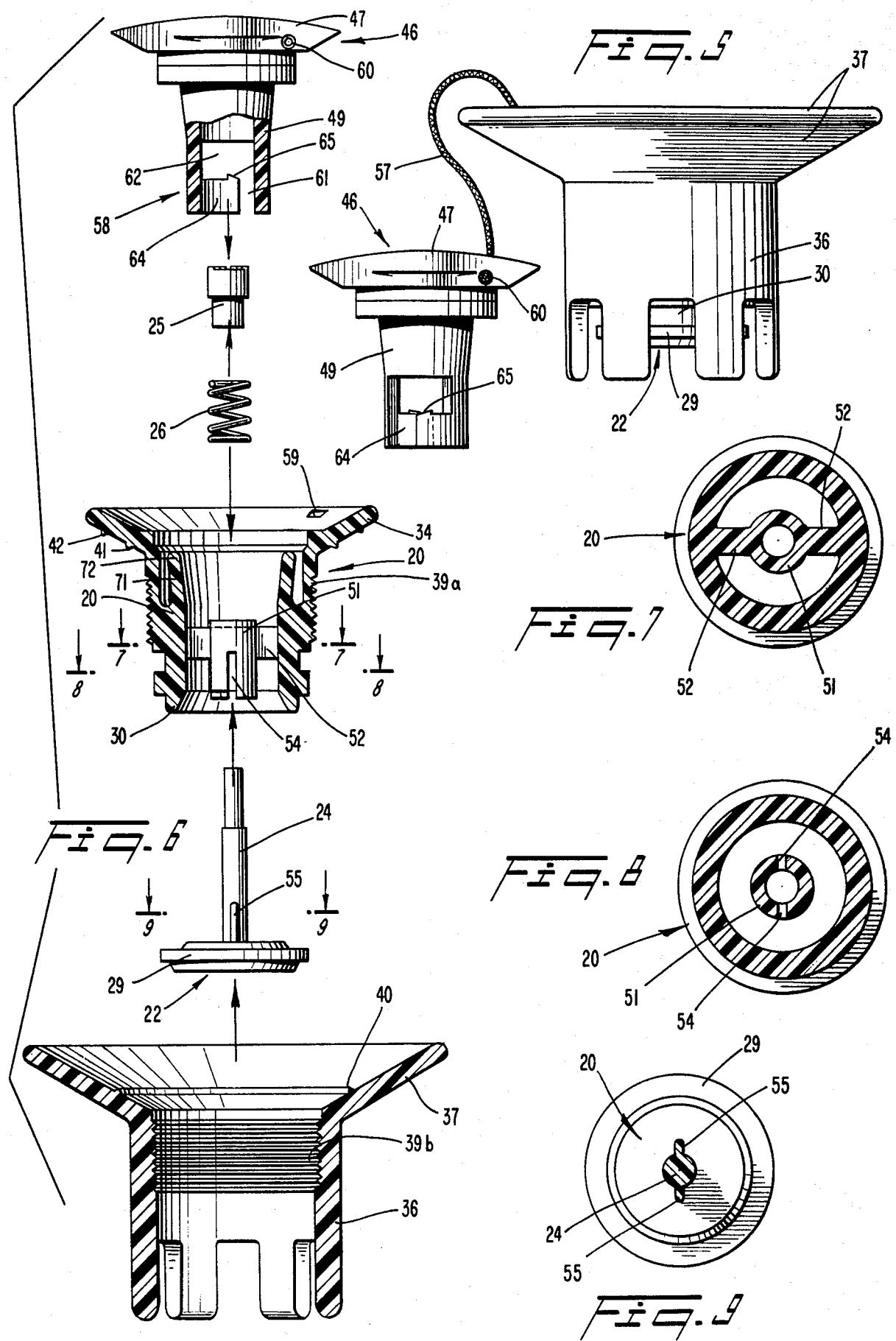

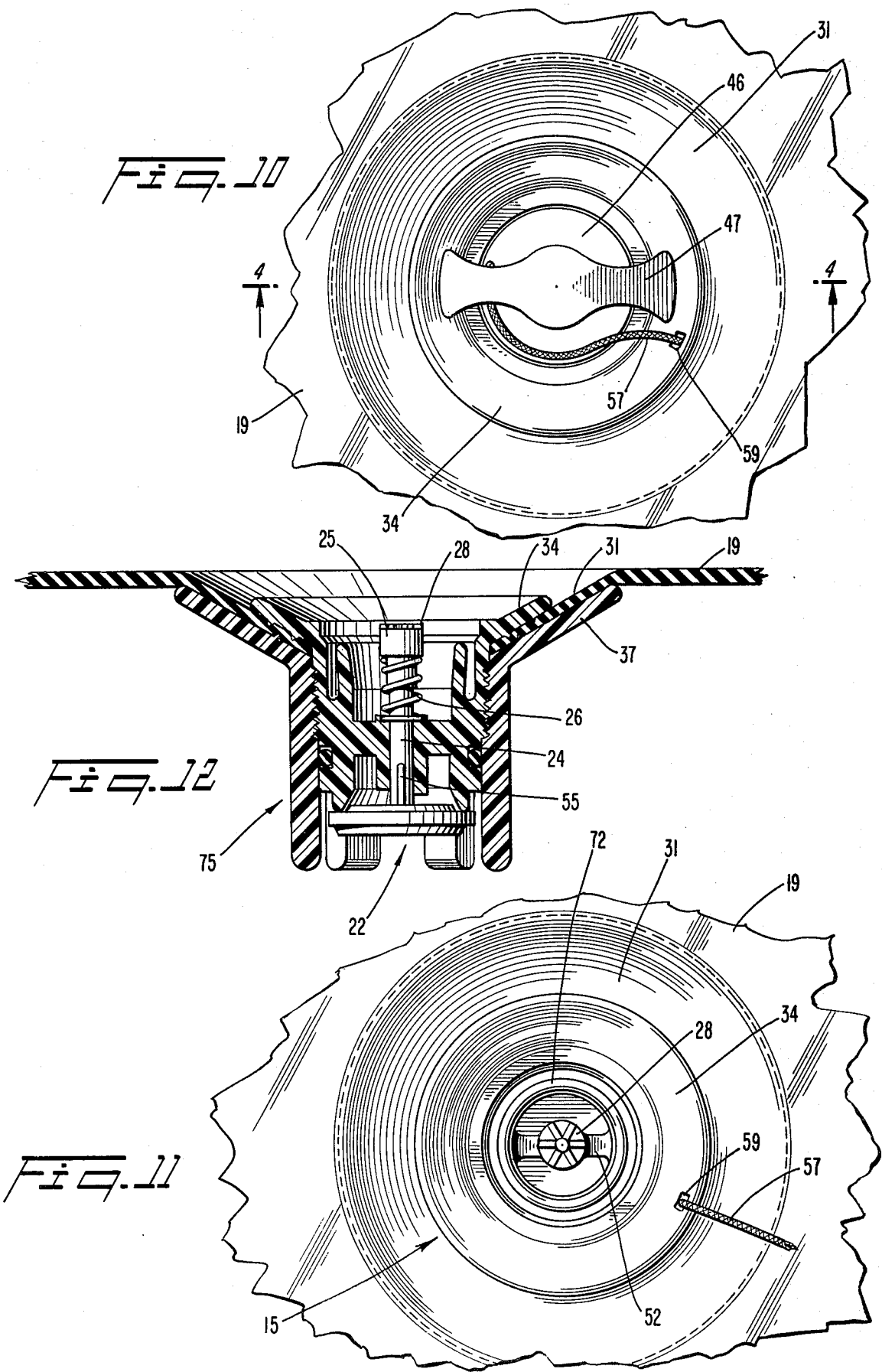

INFLATABLE BOAT VALVE AND MOUNTING THEREFOR

This invention relates to valves adapted for use on air-inflatable boats, and to the mountings therefor. Such valves include the two main types of valves used on inflatable boats: those used for inflation/deflation, and those used for pressure relief.

Previous designs of the above-mentioned valves extend considerably above or beyond the outer layer of the fabric of the inflatable boat. When one of such valves was mounted in the cockpit of the boat, the protruding valve could cause discomfort to the occupants of the boat. When the valve was mounted on the outside of the boat, the protruding valve could potentially become snagged on branches or the like, or upon piers, thereby damaging the valve or deflecting the boat from its desired path.

Illustrated and described herein are a boat deflating valve, three different embodiments of mountings for such valve, a pressure relief valve adapted for use on an inflatable boat, and two embodiments of mountings for such relief valve on an inflatable boat.

The invention will be more easily and fully comprehended by reference to the accompanying drawings, in which:

FIG. 1 is a view in plan of an inflatable boat with a deflating valve and mounting means therefor in accordance with the invention disposed thereon;

FIG. 2a is a fragmentary view in transverse section through the boat, the valve, and its mounting means of FIG. 1, the section being taken along the line 2a—2a in FIG. 1;

FIG. 2b is a fragmentary view similar to FIG. 2a but with the valve and its mounting means mounted in a different position upon the boat;

FIG. 2c is a view similar to FIGS. 2a and 2b, but with the valve and its mounting means disposed in yet another position upon the boat;

Figure 14:
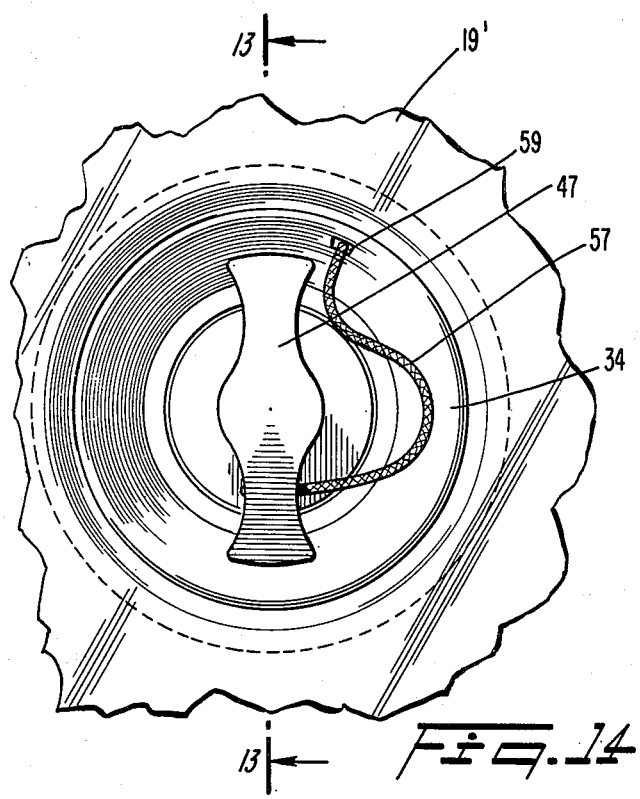
Figure 13:
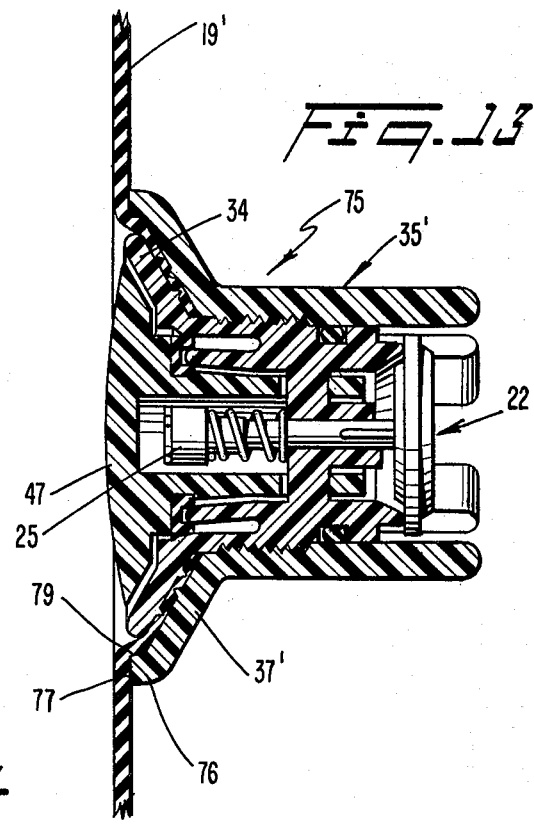
Figure 16:
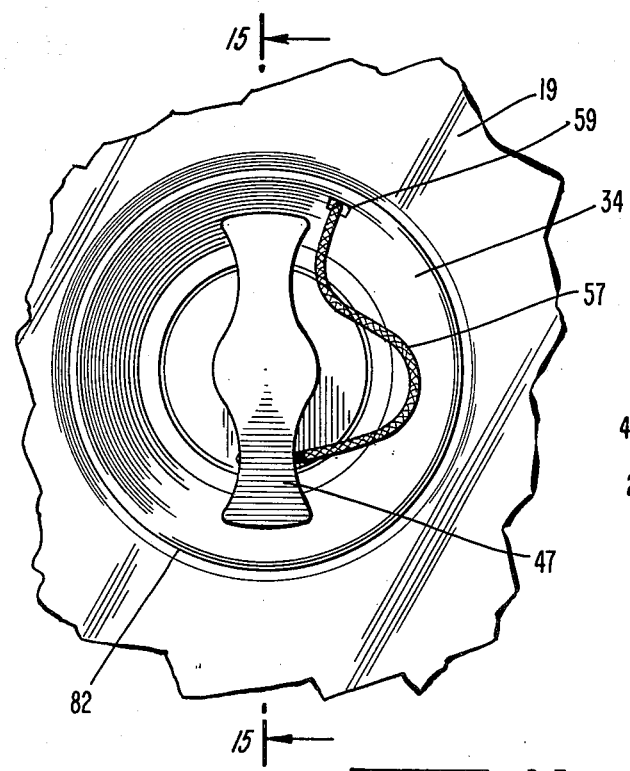
Figure 15:
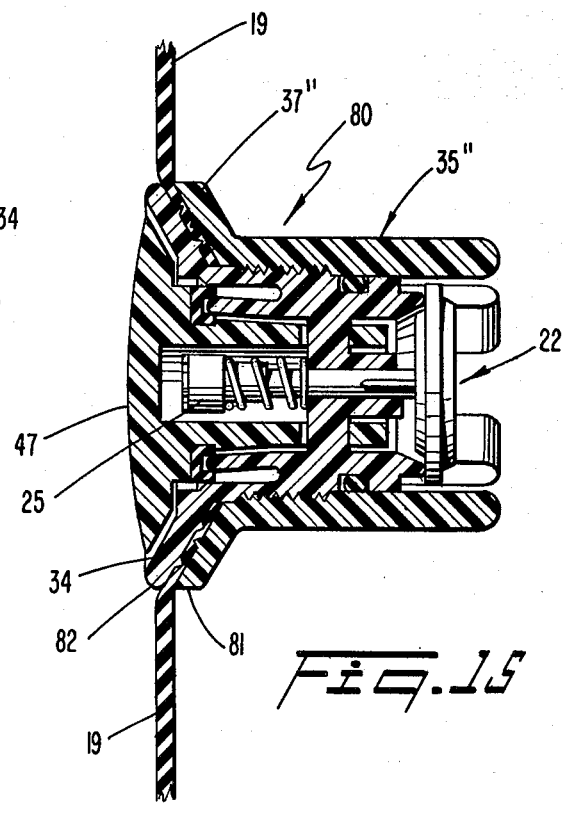
Figure 18:
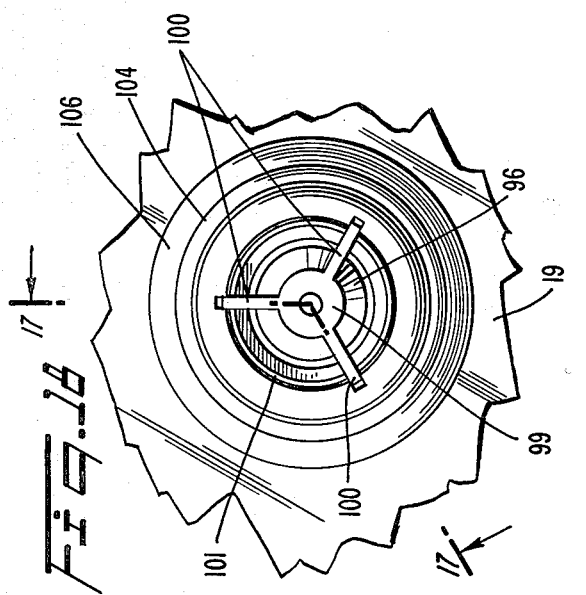
Figure 21:
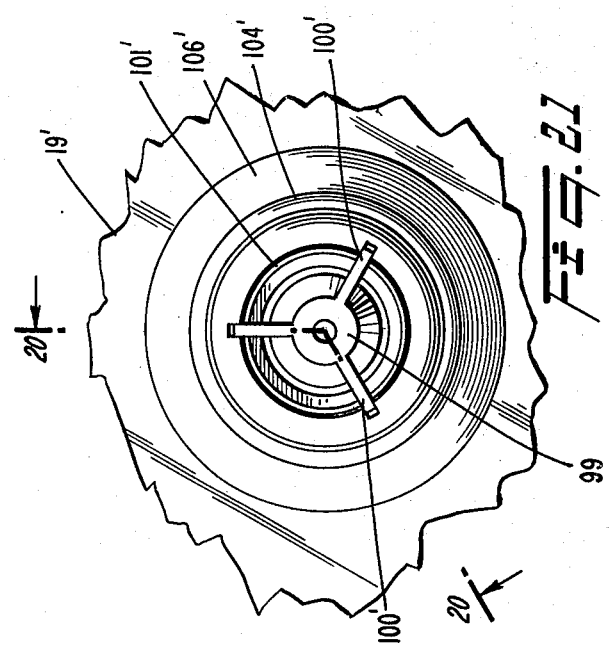
Figure 17:
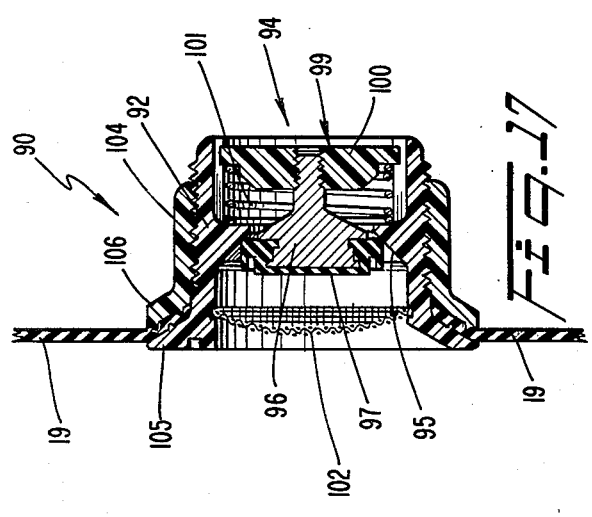
Figure 20:
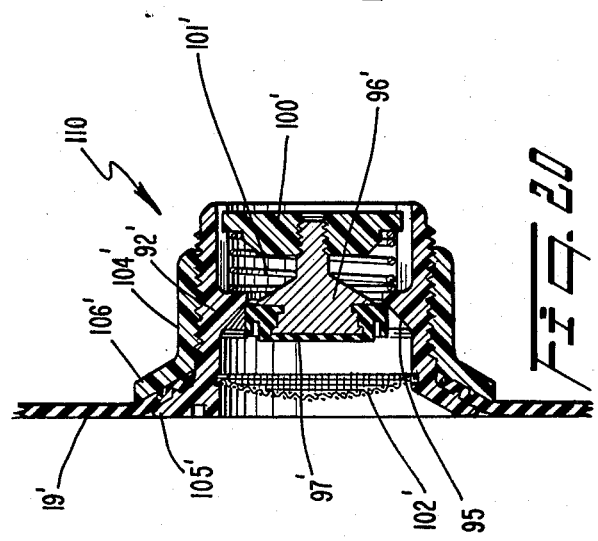
Figure 19:
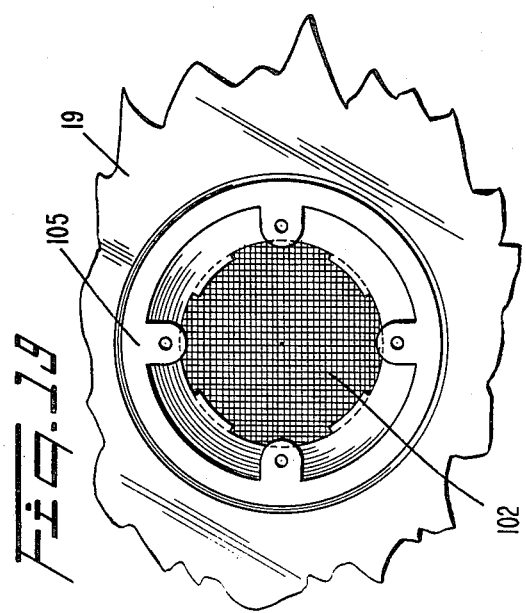
Figure 22:
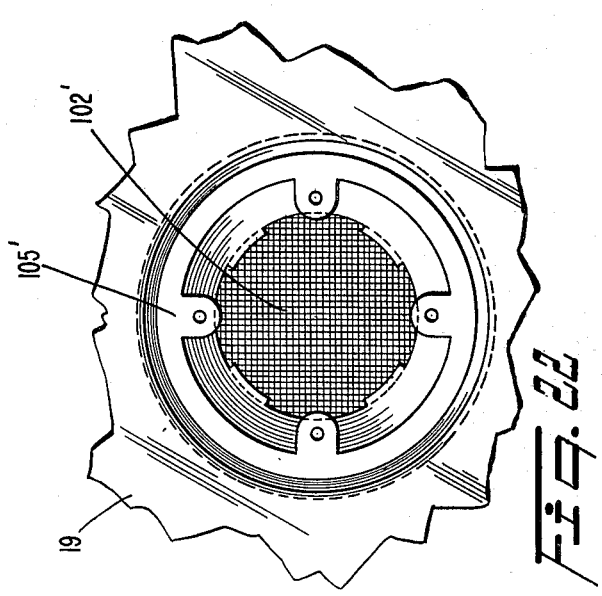

FIG. 2d, which is labeled "Prior Art", is a view in cross-section through an inflatable boat, such figure showing a prior art deflating valve, its mounting means, and the positioning of the valve and mounting means on the inflatable boat;

FIG. 3 is a view in vertical section of a boat deflating valve in accordance with the invention, the valve being shown in its open position, the valve being shown mounted in a fragmentarily shown fabric of an inflatable boat by a first embodiment of valve mounting means which disposes the valve and a dust cap which may be employed therewith with all parts of the valve and the dust cap disposed no higher than level with the outer surface of the boat fabric, a position hereinafter designated as "flush";

FIG. 4 is a view in vertical section of the valve of FIG. 3 in its valve-closed position, and with a dust cap secured thereon, the section being taken along the line 4—4 in FIG. 10;

FIG. 5 is a view in side elevation of the valve and its mounting means of FIGS. 3 and 4, with the dust cap removed therefrom but tethered thereto;

FIG. 6 is an exploded view partially in side elevation and partially in axial section of the valve, its mounting means, and the dust cap therefor shown in FIG. 5;

FIG. 7 is a view in transverse section through the body of the valve, the section being taken along the line 7—7 in the valve body shown in FIG. 6;

FIG. 8 is a view in cross-section through the body of the valve as shown in FIG. 6, the section being taken along the line 8—8 in FIG. 6;

FIG. 9 is a view in cross-section through the movable element of the valve as shown in FIG. 6, the section being taken along the line 9—9 in FIG. 6;

FIG. 10 is a view in plan of the valve and its mounting means shown in FIG. 4;

FIG. 11 is a view similar to FIG. 4, but with the dust cap removed from the valve;

FIG. 12 is a view in plan similar to FIG. 10, but with the dust cap removed from the valve;

FIG. 13 is a fragmentary view partially in axial section and partially in side elevation of a second embodiment of valve mounting means secured and sealed to a fragmentarily shown fabric of an inflatable boat, the section being taken along the line 13—13 in FIG. 14;

FIG. 14 is a view in plan of the valve and its mounting means of FIG. 13;

FIG. 15 is a view partially in axial section and partially in elevation of a third embodiment of valve and mounting means therefor in accordance with the invention, the section being taken along the line 15—15 of FIG. 16;

FIG. 16 is a view in plan of the valve and its mounting means of FIG. 15;

FIG. 17 is a view in axial section through a pressure relief valve and its mounting means in accordance with the invention, the section being taken along the broken line 17—17 in FIG. 18;

FIG. 18 is a view in end elevation of the valve and mounting means of FIG. 17, the view being taken in the direction from right to left in FIG. 17;

FIG. 19 is a view in end elevation of the valve and its mounting means of FIG. 17, the view being taken in the direction from left to right in FIG. 17;

FIG. 20 is a view in axial section through a pressure relief valve similar to that shown in FIGS. 17, 18 and 19, and of a further embodiment of mounting means therefor, the section being taken along the line broken 20—20 in FIG. 21;

FIG. 21 is a view in end elevation of the valve and its mounting means of FIG. 20, the view being taken in the direction from right to left in FIG. 20; and FIG. 22 is a view in end elevation of the valve and its mounting means of FIG. 20, the view being taken in the direction from left to right in FIG. 20.

As will be apparent from the above, FIGS. 3-12, incl., illustrate a first mounting means for an inflatable boat deflating valve; FIGS. 13 and 14 illustrate a second embodiment of mounting means for such valve; FIGS. 15 and 16 illustrate a third embodiment of mounting means for the inflatable boat deflating valve; FIGS. 17, 18 and 19 show a pressure relief valve mounted upon an impervious fabric, such as that of an inflatable boat, by a first mounting means therefor; and FIGS. 20, 21 and 22 show the relief valve of FIGS. 17, 18 and 19 mounted upon and sealed to an impervious fabric by a second embodiment of mounting means therefor.

Turning first to FIG. 1, there is there shown in plan an inflatable boat 10 having inflated side members 11 and a cockpit floor or deck 12. A boat deflating valve and its mounting means in accordance with the invention, generally designated 15, are shown mounted on the top of one of the inflatable side members 11 of the boat 10.

In FIG. 2d, labeled "Prior Art", there are shown a combined prior art valve and its mounting means 14 disposed on the inner side surface of the part 11 of an inflatable boat. It can be seen that such valve and its mounting means intrude upon the passenger-accomodating space of the boat, and are thus disadvantageous for at least some of the reasons given above. The same would be true if the combined valve and mounting means 14 were mounted on the top or on the outer side of the part 11 of the boat.

FIGS. 2a, 2b, and 2c show alternative locations of mounting of any of the deflating or relief valves and the mounting means therefor of the present invention. Thus in FIG. 2a such combination, designated 15, is shown mounted at the top of the portion 11 of the inflatable boat and entirely within part 11 of the boat. In FIG. 2b the combination of the valve and its mounting means is shown disposed in the wall of part 11 of the boat facing the passenger-accomodating space therewithin. In FIG. 2c the combination 15 is shown mounted upon the outer side surface of the part 11 of the boat. It can be seen that none of the arrangements shown in FIGS. 2a, 2b, and 2c intrudes upon the pasenger space of the boat, nor does it position the valve and its mounting means so that it could be snagged by any extraneous objects.

In FIGS. 3-12, incl., a first embodiment of valve and mounting means combination 15 is shown secured and sealed to a section of inflatable boat fabric 19. Fabric 19 is in this instance relatively non-extensible and non-elastic. The valve has a valve body 20 having a central bore 21 therein, bore 21 receiving the stem 24 of a movable valve element 22 which is reciprocable relative to the valve body. The movable valve element 22 has a head 25 which is mounted upon the upper end of stem 24, a coil compression spring 26 being disposed between the head 25 and a transversely disposed radially inner transverse portion which forms an integral part of the valve body. Integral with the lower end of the valve stem 24 is a flange 27 having an annular rubber or rubber-like gasket 29 disposed in an annular seat on the upper surface of the flange 27. The spring constantly urges the movable valve element 22 upwardly into its valve-closed position, shown in FIG. 4, wherein the annular gasket 29 sealingly engages an annular valve seat 30 which forms an integral part of the valve body 20. The valve is opened by thrusting the movable valve element 22 downwardly into the position shown in FIG. 3 by engagement of the upper ribbed surface of head 25 on the stem of the movable valve element as by one's finger or thumb.

The valve body 20 is mounted upon and sealed to the boat fabric 19 as follows. The valve body 20 has an upwardly diverging frusto-conical flange 34 on the upper end thereof. A hole is cut into the fabric 19 in the desired location, and the body 20 of the valve is inserted downwardly through such hole so that the flange 34 of the body rests upon the upper surface of the fabric around the hole therein. A nut or outer housing 35 having a circular cylindrical sleeve portion 36 and a frusto-conical portion 37 extending parallel to the flange 34 is then threadedly connected to the body 20 at 39, there being an external thread 39a on the body 20 and an internal thread 39b, mating with thread 39a, on the portion 36 of the outer housing 35. The parts 20 and 35 are now screwed strongly together so as to engage the portion 31 of fabric 19 between them. An O-ring 38, disposed in annular groove and body 20, forms a seal between parts 20 and 36. The flanges 34 and 37 are sealed to the fabric 19 by reason of the clamping of the fabric between the frusto-conical flanges 34 and 37.

Two radially spaced annular ribs 41 and 42 are disposed on the lower surface of flange 34, and an annular rib 40 on the upper surface of flange 37 is disposed midway between ribs 41 and 42.

The frusto-conical flange 37 on the housing or nut 35 has a diameter which considerably exceeds that of the flange 34. Because of such relationship, and of the other parameters of the valve and its housing as shown in the drawings, when the valve is fully mounted and sealed upon the fabric 19 as shown in FIG. 3, the annular radially outer and upper surface of flange 34, which is the highest exposed surface of the valve and its mounting means, is disposed considerably below the upper surface 44 of the boat fabric 19.

The valve is provided with a dust cap 46, shown applied to the valve in FIGS. 4 and 10, which is of such shape and size, and which cooperates with the valve in such manner that the upper surface 69 of the dust cap does not extend beyond the upper surface 44 of the boat fabric 19.

The dust cap 46 has an upper portion 47 functioning as a two-armed handle, and a depending central sleeve portion 49, portion 49 having a central space 50 therewithin which receives the upper end of the stem 24 and its head 25 of the movable valve element when the dust cap is applied to the valve body as shown in FIG. 4. The previously-referred to radially inner transverse portion of the valve body is that upon which the lower end of the coil compression rests. A part of the portion of the body 20 of the valve which receives and guides the stem 24 of the movable valve element is in the form of a central sleeve 51 which is connected to the main outer portion of the valve body 20 by two oppositely directed arms 52 integral with such body. The lower end of sleeve 51 is diametrically slotted as shown at 54, the two portions of slot 54 receiving respective axially extending diametrically opposed ribs 55 or stem 24 (FIG. 9). The dimensions of the parts are such that when the movable valve element 22 is thrust downwardly as by a finger engaging the radially ribbed upper surface 28 of head 25 on the stem 24 the movable valve element can be rotated about its axis when the stem 24 has been pushed downwardly far enough to free the ribs 55 from slots 54. The movable valve element can now be turned clockwise relative to the valve body so that the upper ends of the ribs 55 then rest upon the ungrooved lower end surface of the sleeve 51, thereby releasably locking the movable valve element in its lower valve-open position.

The dust cover or cap 46 for the valve is secured thereto in the position shown in FIG. 4 by a bayonet-type connector on the lower end of the central sleeve 49 of the dust cap which cooperates with the bridge arms 52 of the body 20 of the valve. Such connector is formed by two diametrically opposite axially directed slots 61 in the lower end of the sleeve portion 49 of the dust cap, and two similar circumferentially directed openings 62 connected to the upper part of the respective slots 61. The slots 61 and the circumferentially directed spaces 62 result in the formation of part-annular portions 64 integral with sleeve member 49, each such part 64 having an upper, ramp-like surface 65 on its entering upper surface followed by a smooth transverse surface. The cap is initially applied to the body 20 of the valve by telescoping it thereinto so that the arms 52 of the valve body are received within the slots 61. After the dust cap has been advanced as far axially as it can go into the valve body 20, the dust cap is then turned in such direction as to thrust the arms 52 past the ramp-like projections 65 and to compress a resilient sealing ring 70 on the dust cap following which the sharp edges of the ramp-like members 65 function as locks to retain the dust cap securely in position. The dust cap is removed by turning it counter-clockwise relative to the valve body and then pulling it axially outwardly therefrom.

When fully applied to the valve body 20, the dust cap forms a seal therewith by virtue of forcible engagement between the annular resilient sealing ring 70 on the dust cap which sealingly engages the annular upper end surface 72 of a centrally disposed upstanding sleeve 71 integral with the body 20 of the valve. The dust cap is tethered to the valve body by a cord 57 which has one end thereof secured to flange 34 thereof at a hole 59 in such flange, the other end of the cord being secured to the dust cap 46 at a hold 60 in the handle 47 thereof.

FIGS. 13 and 14 illustrate a second embodiment of mounting for the above-described boat deflating valve. The mounting of FIGS. 13 and 14 is particularly adapted for use with a boat fabric 19' which is somewhat more elastic than the fabric 19 which is substantially non-extensible and non-elastic. The combination of valve and mounting therefor shown in FIGS. 13 and 14 is generally designated by the reference character 75. Parts of the valve per se, which is of the same construction as that of FIGS. 3–12, incl., are designated by the same reference characters as above.

The housing or nut for the valve in this embodiment is designated 35'. The housing has a frusto-conical flange on its outer end, flange 37' in its main extent paralleling the frusto-conical flange 34 on the body 20 of the valve. The radially outer edge of flange 37', however, is upturned at 76, such annular portion 76 having an upper annular surface 77 which lies substantially on the same level as the radially outer and upper edge of flange 34. Further, portion 76 of flange 37' has an annular radially inner surface 79 which lies radially outwardly of the radially outer surface of flange 34.

As shown in FIG. 13, wherein the housing is shown screwed home upon the valve body and the portion of fabric 19' engaged between the flanges 34 and 37', the fabric is bent downwardly or inwardly somewhat over the surface 79 of flange 37' and is then compressed between the broad surfaces of the confronting flanges 34 and 37' so as to be somewhat reduced in thickness. As a result, a secure and permanent seal is effected between the combination 76 of the valve and its mounting and the fabric 19'. It can be seen that the outer surface of the dust cap on the valve extends little, if any, beyond the outer surface of the fabric 19'.

In FIGS. 15 and 16 there is shown a third species of mounting for the valve. Because the outer surface of the flange on the valve body and the outer surface of the dust cap mounted on the valve extends somewhat beyond the outer surface of the fabric 19, this embodiment is designated a "semi-flush" valve mounting. The combination of valve and valve mounting shown in FIGS. 15 and 16 is generally designated by the reference character 80. Parts of the valve, which is of the same construction as that of the two previously described embodiments, are designated by the same reference characters as used before.

The housing of the combined valve and mounting means 80 of FIGS. 15 and 16 is designated 35". The frusto-conical flange 37" on housing 35" has a radius at its outer edge which is substantially the same as that of the frusto-conical flange 34 of the valve 20, so that such respective radially outer edges 81 and 82 have substantially the same radius. It will be seen that, in this embodiment, the outer edge 82 of the flange 34 of the valve, and the outer end surface of the handle on the dust cap 37 extend a small distance beyond the outer surface of the fabric 19.

In FIGS. 17, 18 and 19 there are shown a pressure relief valve and a first embodiment of mounting therefor. The combined valve and its mounting is designated generally by the reference character 90. The valve 91 has a valve body 92 within which there is mounted an axially movable valve element 94. Valve body 92 has an inwardly converging frusto-conical seat 95 with which the movable valve element 94 cooperates. Specifically, the movable valve element 94 has a head 96 provided with a seat which receives a resilient annular sealing member 97 which sealingly engages the valve seat 92 when the valve is in its valve-closed position, as shown in FIG. 17. The movable valve element 94 is constantly urged toward its valve-closed position by coil compression spring 101 which is disposed between the inner surface of the part of the valve body providing the seat 95 and a nut 99 screwed onto the stem of the movable element 94. As can be seen in FIG. 18, the nut has three equally angularly spaced wings 100 thereon which are reciprocable in guiding slots in the inner end of the valve body. The valve is provided with a screen 102 which spans its outer end as shown.

The mounting has a housing or nut 104 which has a frusto-conical flange 106 on its outer end, flange 106 generally paralleling a frusto-conical flange 105 on the valve body. It can be seen that this mounting is quite similar to that shown in FIGS. 15 and 16, and that the outer surface of the flange 105 extends slightly above the level of the fabric 19.

A further embodiment of combined pressure relief valve and mounting therefor is shown in FIGS. 20, 21 and 22, where such combination is designated generally by the reference character 110. Parts of the pressure relief valve in this embodiment are designated by the same reference characters as those employed above in describing the previous embodiment of relief valve and mounting.

The mounting generally resembles that above-shown and described in connection with FIGS. 3–12, inclusive. The frusto-conical flange 105' in this embodiment has a radius which is somewhat less than that of the frusto-conical flange 106' on the housing or nut 104'. As a result of such design, the annular outer surface of the flange 105' lies substantially in the same level as the outer surface of the boat fabric 19. It can be seen from the above, that in all of the described valve-mounting means, the working portion of the valve can be removed without altering the fabric. The nut or housing of the mounting functions only as a nut and remains inside the chamber within the boat fabric. If the working parts of the valve must be replaced due to wear, they can be removed without cutting the fabric of the boat.

The housing or nut of the valve mounting may be made, for example, from a non-corrodible rigid structural material such as acetal homopolymer. The body of the valve and the dust cap may also be made of acetal homopolymer. The annular sealing member on the movable valve element may be made of a soft rubber such as Buna-N. The stem of the movable valve element of the valve may be made of rigid material such as "Delrin" (a rigid acetal homopolymer), although stainless steel, anodized aluminum, etc. will work equally well.

It will be seen that when the movable valve element of the three described embodiments of deflating valve is not locked in its valve-open position, the boat can be inflated through such valve since the pressure of the entering air will compress the coil compression spring to permit the movable valve element to move at least partially toward the completely opened position of the valve element. Air cannot, however, escape from the boat since the valve acts as a check valve. With the valve in this condition, therefore, the boat can be effectively filled with air through such valve.

Although the invention is illustrated and described with reference to a plurality of embodiments thereof, it is to be expressly understood that it is no way limited to such preferred embodiments but is capable of numerous modifications within the scope of the appended claims.

I claim:

1. In combination: a valve for us with an inflatable article having side walls made of flexible impervious fabric, and means for attaching and sealing the valve to the article at an opening through the side wall thereof, said valve comprising a hollow valve body having a fixed valve seat therein, a valve element within the valve body and selectively movable into and out of sealing engagement with the valve seat, and resilient means constantly urging the valve element toward and into sealing engagement with the valve seat, the means for attaching and sealing the valve to the article comprising a nut screwed onto the valve body, the nut having a first, axially outwardly expanding rigid frusto-conical flange on its axially outer end, said first flange underlying the portion of the fabric which surrounds the opening through the side wall of the article, a second rigid frusto-conical flange attached to the valve body, said second flange being coaxial with and substantially parallel to the first flange, said second flange overlying at least a part of the portion of the fabric which surrounds the opening through the side wall of the article and which overlies the first flange, the two flanges forcibly engaging opposite sides of the said portion of the fabric, whereby to force said portion into a frusto-conical configuration, parallel to and between the confronting surfaces of the first and second flanges, and to form seals between them and the respective surfaces of the said portion of the fabric which they engage.

2. The combination set forth in claim 1, wherein all exposed parts of the valve are disposed no further outwardly of the side wall of the article than the outer surface of the fabric at the location of the valve.

3. The combination set forth in claim 2, wherein each of the flanges has a circular axially outer edge, and the first flange has an outer diameter which substantially exceeds the outer diameter of the second flange.

4. The combination set forth in claim 3, wherein the fabric in the portion thereof surrounding the valve is substantially non-extensible and non-elastic.

5. The combination set forth in claim 1, wherein each of the confronting surfaces of the two frusto-conical flanges has at least one circular bead protruding therefrom, the beads on the respective flanges being disposed upon circles coaxial of the valve and the flanges, said circles being of different diameters.

6. The combination set forth in claim 1, wherein the fabric of the article is extensible and elastic, and wherein the first frusto-conical flange has an axially outer and radially outer annular edge portion which has a shallow radially inner side wall which is substantially circular cylindrical in shape and lies coaxial of the valve body, and the axially outer and radially outer edge of the second frusto-conical flange is telescoped within the axially outer and radially outer annular edge portion of the first flange, and is spaced therefrom so as to grip the fabric there between and to divert it axially inwardly between the confronting surfaces of the two frusto-conical flanges.

7. The combination set forth in claim 1, wherein the axially outer edges of the first and second flanges are of substantially equal diameter, whereby the radially and axially outer edge of the second flange projects a short distance axially above the outer surface of the fabric.

8. The combination set forth in claim 1, comprising a dust cap, which is inserted into and seals the axially outer end of the valve, the dust cap being selectively secured to and removable from the body of the valve by a bayonet-type connection.

9. The combination set forth in claim 8, wherein the axially outer end of the dust cap installed upon and locked to the valve extends axially outwardly no further than the outer surface of the portion of the fabric which surrounds the valve.

10. The combination set forth in claim 8, comprising a flexible tether which extends between the body of the valve and the dust cap.

11. The combination set forth in claim 1, wherein the valve is a deflation valve which selectively also functions as a check valve, and comprising means for selectively holding the movable valve element in its valve-open position removed from the valve seat.

12. The combination set forth in claim 1, wherein the valve is a fluid pressure relief valve.

13. In combination a valve for use with an inflatable article having side walls made of flexible impervious fabric, and means for attaching and sealing the valve to the article at an opening through the side wall thereof, said valve comprising a hollow valve body having a fixed seat therein, a valve element within the valve body and selectively movable into and out of sealing engagement with the valve seat therein, and resilient means constantly urging the valve element toward and into sealing engagement with the valve seat, the means for attaching and sealing the valve to the article comprising a nut screwed onto the valve body, the nut having a first, axially outwardly expanding frusto-conical flange on its axially outer end, said first flange underlying the portion of the fabric which surrounds the opening through the side wall of the article, a second frusto-conical flange attached to the valve body, said second flange being coaxial with and substantially parallel to the first flange, said second flange overlying at least a part of the portion of the fabric which surrounds the opening through the side wall of the article and which overlies the first flange, the two flanges forcibly and sealingly engaging opposite sides of the said portion of the fabric, the valve being a deflation valve which selectively also functions as a check valve, and comprising means for selectively holding the movable valve element in its valve-open position removed from the valve seat, said means for selectively holding the valve element in open position comprising at least one axially extending rib on the valve element, said rib, when the valve element is in valve-closed position, extending into an axially extending slot in a part of the valve body.

* * * * *